United States Patent
Kataria et al.

(10) Patent No.: US 8,954,791 B2
(45) Date of Patent: Feb. 10, 2015

(54) MIRRORING DISK DRIVE SECTORS

(75) Inventors: Abhay Tejmal Kataria, Longmont, CO (US); Christopher Ryan Fulkerson, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 297 days.

(21) Appl. No.: 13/352,477

(22) Filed: Jan. 18, 2012

(65) Prior Publication Data
US 2013/0185589 A1  Jul. 18, 2013

(51) Int. Cl.
*G06F 11/00* (2006.01)
(52) U.S. Cl.
USPC .......................................................... 714/6.13
(58) Field of Classification Search
USPC ................................. 714/6.1, 6.11, 6.12, 6.13
See application file for complete search history.

(56) References Cited

U.S. PATENT DOCUMENTS

| | | | | |
|---|---|---|---|---|
| 6,043,945 A * | 3/2000 | Tsuboi et al. | | 360/53 |
| 6,393,580 B1 * | 5/2002 | Harada | | 714/2 |
| 7,506,224 B2 * | 3/2009 | Ejiri et al. | | 714/710 |
| 7,594,135 B2 * | 9/2009 | Gonzalez et al. | | 714/6.1 |
| 7,702,954 B2 | 4/2010 | Yoshida | | |
| 7,779,207 B2 | 8/2010 | Pudipeddi | | |
| 8,427,771 B1 * | 4/2013 | Tsai | | 360/31 |
| 2009/0034107 A1 | 2/2009 | Posamentier | | |
| 2009/0182933 A1 * | 7/2009 | Jang et al. | | 711/103 |
| 2009/0217024 A1 * | 8/2009 | Childs et al. | | 713/2 |

* cited by examiner

*Primary Examiner* — Scott Baderman
*Assistant Examiner* — Joseph Kudirka
(74) *Attorney, Agent, or Firm* — Hollingsworth Davis, LLC

(57) ABSTRACT

A recoverable error associated with a first disk drive sector is determined. Data of the first disk drive sector is duplicated to a mirrored sector in response to the recoverable error. The first disk drive sector continues to be used to store the data after the recoverable error is determined.

11 Claims, 6 Drawing Sheets

MIRRORING DISK DRIVE SECTORS

SUMMARY

The present disclosure is related to systems, apparatuses, and methods capable of mirroring disk drive sectors. In one embodiment, a method involves determining a recoverable error associated with a first disk drive sector and duplicating data of the first disk drive sector to a mirrored sector in response to the recoverable error. The first disk drive sector continues to be used to store the data after the recoverable error is determined.

In another embodiment, an apparatus includes a controller configured to cause the apparatus to determine a recoverable error associated with a first disk drive sector and duplicate data of the first disk drive sector to a mirrored sector in response to the recoverable error. The controller also causes the apparatus to continue to use the first disk drive sector to store the data after the recoverable error is determined.

In another embodiment, an apparatus includes a controller configured to cause the apparatus to determine a first order indicator exhibited by a targeted sector of a hard drive. The first order indicator implies importance of data stored in the targeted sector to a host. The controller also causes the apparatus to duplicate the data of the targeted sector to a mirrored sector in response to the first order indicator, and to add a reference to at least one of the mirrored sector and the targeted sector in a collection of references to sectors. The collection is used to manage unrecoverable errors exhibited by the respective sectors.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

Figure 1:
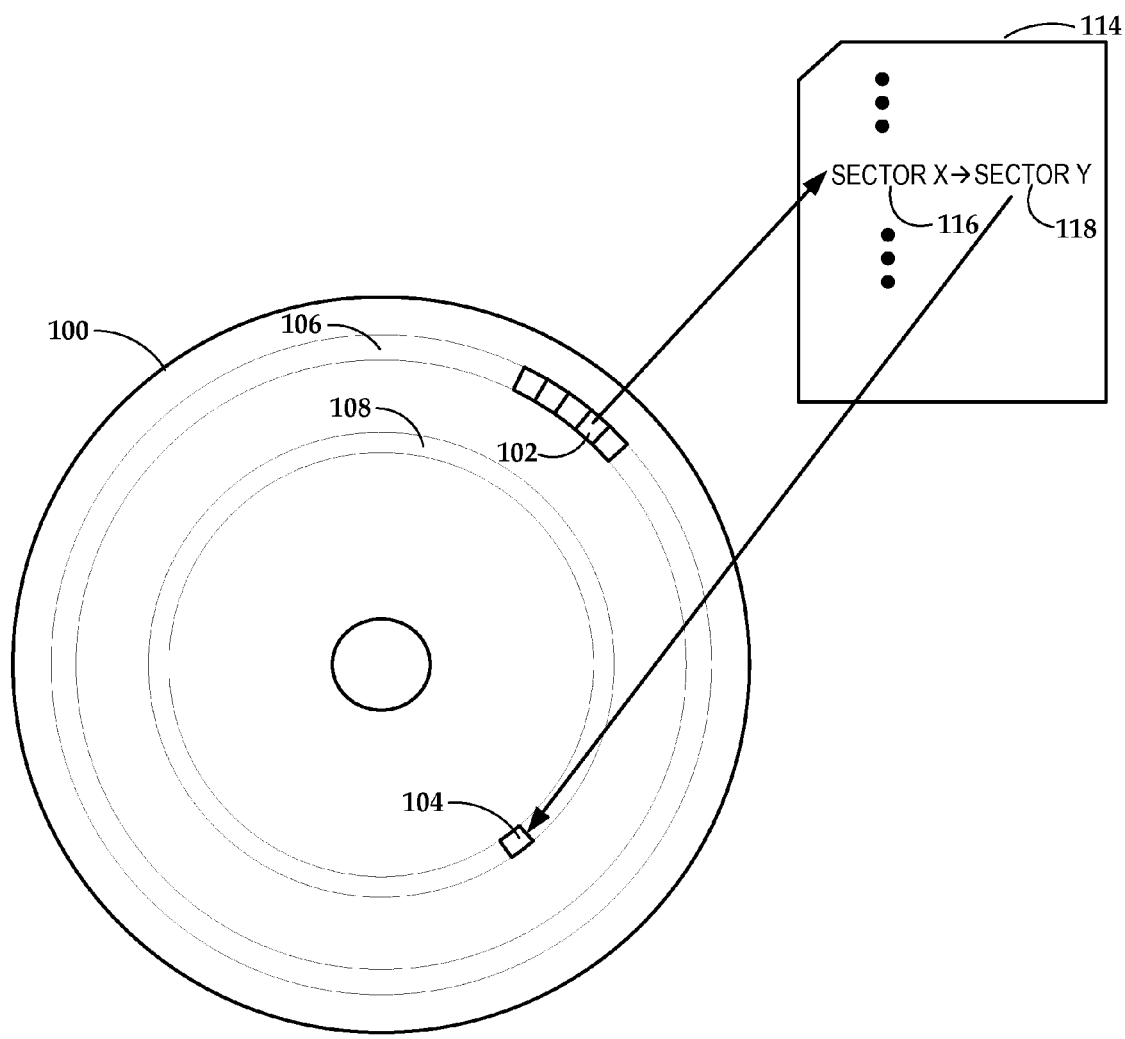
FIG. 1 is a block diagram of a mirrored drive sector according to an example embodiment.

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to apparatuses, systems and methods to ensure integrity of data stored on hard disk drives (HDDs) and similar data storage devices. As HDD areal density increases, existing mechanisms for managing data integrity may become overwhelmed due to the large number of data sectors on the drive. For example, algorithms designed to detect media flaws may attempt to strike a balance between being sensitive enough to detect degraded sectors, and yet being robust enough to avoid false detections. In cases where priority is given to protecting user data, devices may be configured err on the side of over-detecting flaws. As the number of sectors being used/sampled increases, the overhead used in dealing with false detections may increase accordingly, and this may affect performance of the storage device.

One existing approach for dealing with suspected errors is to reallocate the affected sectors to a new location on the hard drive. This can be effective in preventing data loss, but is generally permanent and can, in some cases, can impact performance. For example, remapping sectors can lead to file fragmentation, which can slow down access to files. This remapping/reallocation also may require an uninterrupted commit. Any of these conditions may be detrimental to the experience of the end user if, for example, the conditions occur often and/or at high frequency.

As will be described in detail below, one alternative to permanent reallocating/remapping of sector data involves mirroring user data for sectors that trip an indicator. This indicator may be a condition (e.g., error) that is by itself recoverable, but may signal a possible future failure of the affected sector. The affected sector continues to be used, but is monitored for further signs of trouble. A reference to the affected sector and/or mirrored sector can be maintained in a persistent data structure (e.g., list). This list can be used for purposes such as mirroring changes to the affected sector, logging additional indicators, recovery of the mirrored data, etc.

Another example of an indicator that can trigger mirroring of a sector is a usage pattern that indicates the data in the sector may be particularly important to the host device. For example, if a particular set of sectors are always accessed first upon host power-up, this may indicate that the data in the sectors is required for successful booting of the host. An example of such data is a master boot record (MBR), which contains data used by a basic input-output system (BIOS) for loading one or more operating systems (OS) at boot time. Another indicator of potentially valuable data sectors is rate of access and/or frequency of access to particular sectors. These accesses may be indicative of important host data (e.g., disk partition tables, kernel, drivers, filesystem metadata, OS registry) that can be detected based on usage patterns. In any of these cases, the indicators may imply data stored in the sectors is particularly sensitive to failure. In such a case, the drive may also mirror this data automatically as described herein.

In FIG. 1, a block diagram illustrates mirroring of drive sectors according to an example embodiment. A magnetic disk 100 stores data in concentric tracks (e.g., tracks 106, 108), which are further divided into sectors (e.g., sectors 106, 108). For purposes of clarity, the physical sizes of the tracks 106, 108 and sectors 106, 108 in the figure may be exaggerated relative to the size of the disk 100. A sector generally represents the smallest individually addressable unit of data on the disk 100, and is commonly 512 bytes, although other sector sizes can be used. The data stored on the disk 100 is read from and written to via a read/write head (not shown) while the disk 100 rotates.

As described above, an operation (e.g., read/write) performed on a sector (e.g., sector 102) may exhibit conditions that, while recoverable, may indicate potential for failure in the near future. Or the host may use data stored in the sectors in such a way that suggest the data is important to operation of the host. These indicators will be referred to herein as "first order" indicators. Examples of these first order indicators include number of clean-ups required of the sector, degraded error rate, number of writes to a region before data can be verified, a usage pattern upon boot/reboot, frequency of sector access, etc.

While error-based first order indicators may signal future problems with sector 102, these indicators may also occur in response to transient events, such as shock/vibration, temperature extremes, disk churning, etc. In such a case, the indicators may not point to an imminent failure, because these types of indicators may disappear once the transient event has stopped. Instead of permanently relocating data from the sector 102 based on one or more first order indicators, an apparatus can instead mirror data of the affected sector 102 to another sector 104. Any free sector on the disk 100, e.g., unused user space, overprovisioned storage, etc. can be used for storing the mirrored data. This mirroring operation can also be performed for first order indicators that suggest host-sensitive data. Data such as the MBR and kernel may be only infrequently written to, and therefore mirroring the sector imposes little future overhead.

A data structure 114 can temporarily or persistently store a reference to the mirroring operation. In this example, the data structure 114 includes a collection (e.g., list) of references 116, 118 to the affected and mirrored sectors 102, 104, respectively. The data structure 114 may be stored on the disk 100 with user data, or in some other volatile or non-volatile memory of the data storage apparatus of which the hard disk 100 is part. The data structure 114 may include any composition and arrangement of data, such as a set, map, hash table, linked list, etc., for storing a reference to at least one of the sectors 102, 104.

After data of the affected sector 102 has been mirrored to sector 104 due to a first order indicator, the affected sector 102 may still be used for storing the user data. For example, in response to a read request targeted to a location that has been mirrored, the primary copy can be read. When data is written to a location that has been mirrored, both copies of the data are written. The mirrored copy may only need to be read in the event that the primary copy is unrecoverable. In this way, user data is made secure in the short term without permanently remapping the sector.

Data in the structure 114 can subsequently be re-evaluated (e.g., during idle time) to determine if the sector is truly degraded or if it was being affected by a transient event. Similarly, if a first order indicator indicates a sector is storing host-sensitive data (e.g., MBR) due to host access patterns, then re-evaluation of these patterns may also be performed, such as during idle time. It may be the case that the usage pattern was temporary, e.g., due to a temporarily installed diagnostic program, in which case mirroring of the data can be discontinued.

In one example scenario, during a background scan of the media, a disk drive encounters a sector that requires retries to recover. A rewrite of the sector improves the error rate, bringing it in line with a typical sector. The rewritten sector is then mirrored as a result of having been degraded previously. Later, the host may request data from the sector, but the drive determines that the sector is unrecoverable. Fortunately, the sector had previously been mirrored. The drive then accesses the mirrored location to return the data to the host. At this point, the mirrored sector can be remapped to replace the original sector, and the original sector can then be cleaned and reallocated, or marked as permanently failed as circumstances may require.

In another scenario, a sector is mirrored for a similar reason as described above. The original sector in the mirrored list may be repeatedly accessed (e.g., written to and read from) after the recovery and mirroring operation. The primary copy shows no symptoms of degradation during these operations. Based on prolonged demonstration of good reliability of the primary sector, the data referencing this sector is removed from the mirrored list. The mirrored sector can also be cleaned and/or put back into service for other uses.

Figure 2:
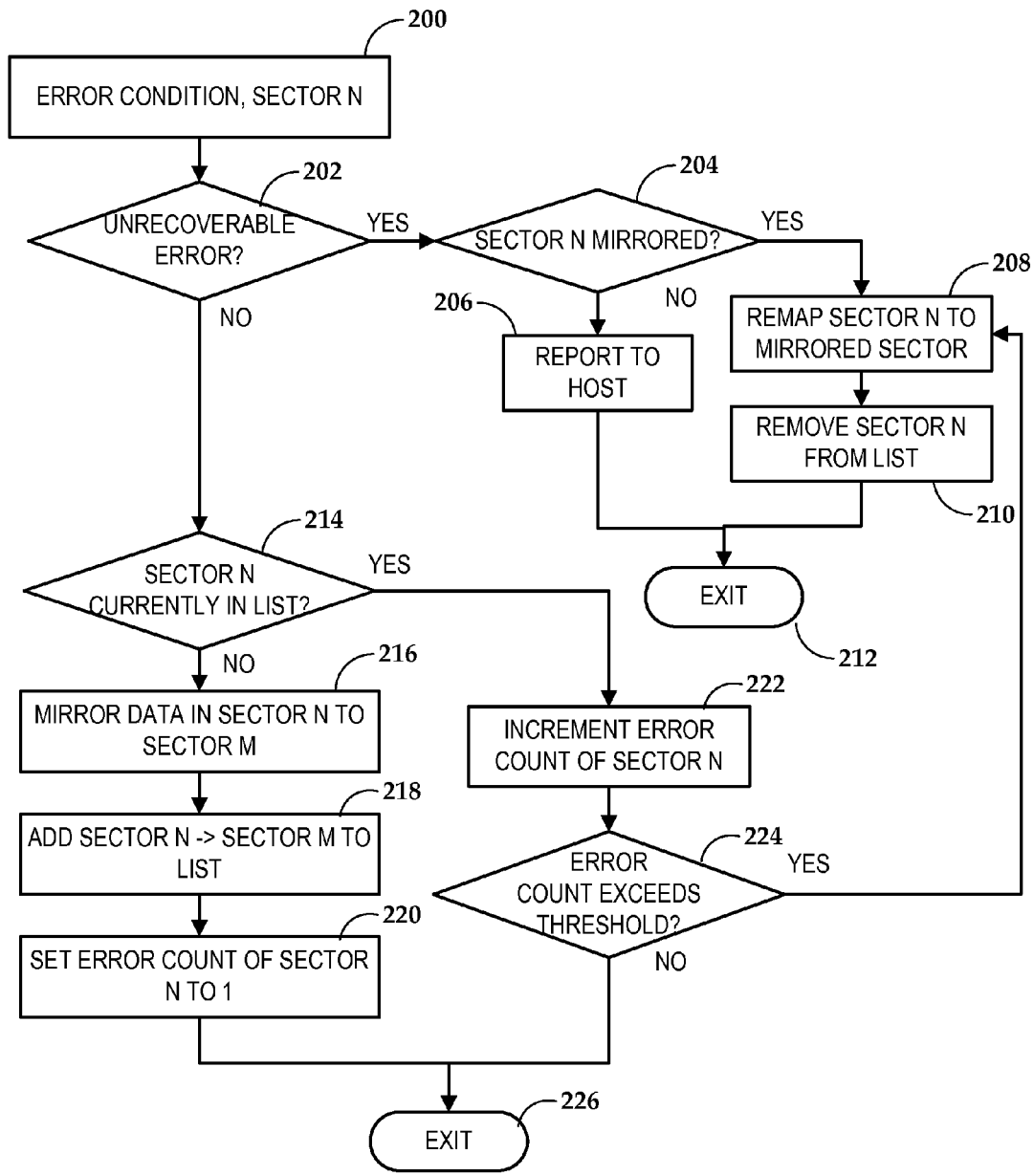
FIG. 2 is a flowchart illustrating mirroring of drive sector operations occurring in response to an error condition according to an example embodiment.

In reference now to FIG. 2, a flowchart illustrates some aspects of mirroring sector data according to an example embodiment. In this example, the procedure is triggered in response to an error condition 200 affecting a sector. This procedure need not be directly triggered when an error is found, however. For example, statistics related to error conditions (e.g., recoverable errors) could be tracked separately, e.g., logged during periods of drive activity. In such a case, procedure to evaluate error conditions for purposes of mirroring such as in FIG. 2 could be invoked based on some other event (e.g., time-based polling, idle condition, initialization, shut down, etc.) and use those previously gathered statistics to evaluate error conditions 200.

In this case, the particular event 200 that triggers the procedure is checked 202 to determine if the error is unrecoverable. The use of the term "unrecoverable" does not necessarily require that the error ultimately results in data loss at the host. For example, higher-level system measures, such as hard-drive mirroring and shadow copying may enable recovery of the sector data. Nonetheless, for purposes of this procedure, it may be assumed that the sector data may be at least momentarily unrecoverable by the data storage apparatus itself. If so, another determination 204 is made to see if the sector has already been mirrored (e.g., using a mirrored sector 104 and recorded in a data structure 114 as shown in FIG. 1). If the sector has not been mirrored, then this can be at least reported 206 to the host for further action.

If the determination at 204 indicates the sector has been mirrored, then the mirrored sector can be remapped 208 to replace the affected sector. This remapping 208 may occur at the physical and/or filesystem level, and may also require removal 210 of the mapping references from the list (or other data structure) that tracks the mirrored sectors. Whether the sector has been remapped 208 or an error reported 206 to the host, the procedure may terminate 212 at this point. In either of these events, other actions may occur that are not shown, such as marking the affected sector to prevent further use.

In the event that the error has been determined at 202 as recoverable, another determination 214 is made as to whether the affected sector has already experienced an analogous event, e.g., which has previously caused the sector to be mirrored and recorded in the list. If the sector has not yet been mirrored, then data of the sector is mirrored 216 (e.g., copied) to a new sector. Data describing the mirroring event (e.g., affected sector address, mirrored sector address, event/error identifier) is added 218 to the list, and an error count may be initialized 220 for the sector.

In this example, the initialization 220 involves setting a count to one, although other schemes may be used. For example, different error types may have different weights, such that the initialization value used at 220 (and subsequent incrementing of that value) may depend on the type of error condition 200 that triggered the procedure. Similarly, some error patterns (e.g., particular sequence of errors of particular types) may be more strongly indicative of future failure than other patterns, and this can be taken into account both during initialization 220 and subsequent evaluations, e.g., determinations made at 222 and 224. In yet another variation, a timestamp (either alone or with an error count value) is recorded at 220. Subsequent determinations (e.g., at 224) may be based on elapsed time since the last error, and may be considered either along with or instead of an error count. In another variation, importance of sector data to the host (e.g., based on host access patterns) may be used to more highly weight error indicators. This importance of the sector data may be explicit (e.g., communicated via host interface to the drive firmware) or implied (e.g., through usage patterns by the host).

If the result of determination 214 is that the affected sector is already in the list, then the error count value may be incremented 222 as described above. The incremented count may then be compared 224 to some threshold, or tested against some other criteria, such as a pattern of activity and/or elapsed time. If this count exceeds the threshold, then it may be prudent at this time to remap the data 208 and remove 210 the affected sector from the list. If the count does not exceed the threshold, then the procedure may exit 226. It should be noted that for any events leading to exit condition 226, the data referencing the affected sector and/or mirrored sector remains in the list, and the affected sector continues to be relied upon as a source of the data.

A device according to the example embodiments may also provide a mechanism for removing an item from the list of mirrored sectors. This mechanism may be invoked, for example, conditions that indicate that the perceived risk to the sector no longer applies. Examples of these conditions include, but are not limited to, prolonged demonstration of low error rate on the sector, reduction in the number of target writes in the vicinity, a high number of power-on hours passing with the sector showing no symptoms of degradation, etc. In situations where the sector was mirrored due to possible high importance to the host, a subsequent change in usage patterns (e.g., infrequent access to the sector) may also indicate that the reason for originally mirroring the sector no longer applies.

Figure 3:
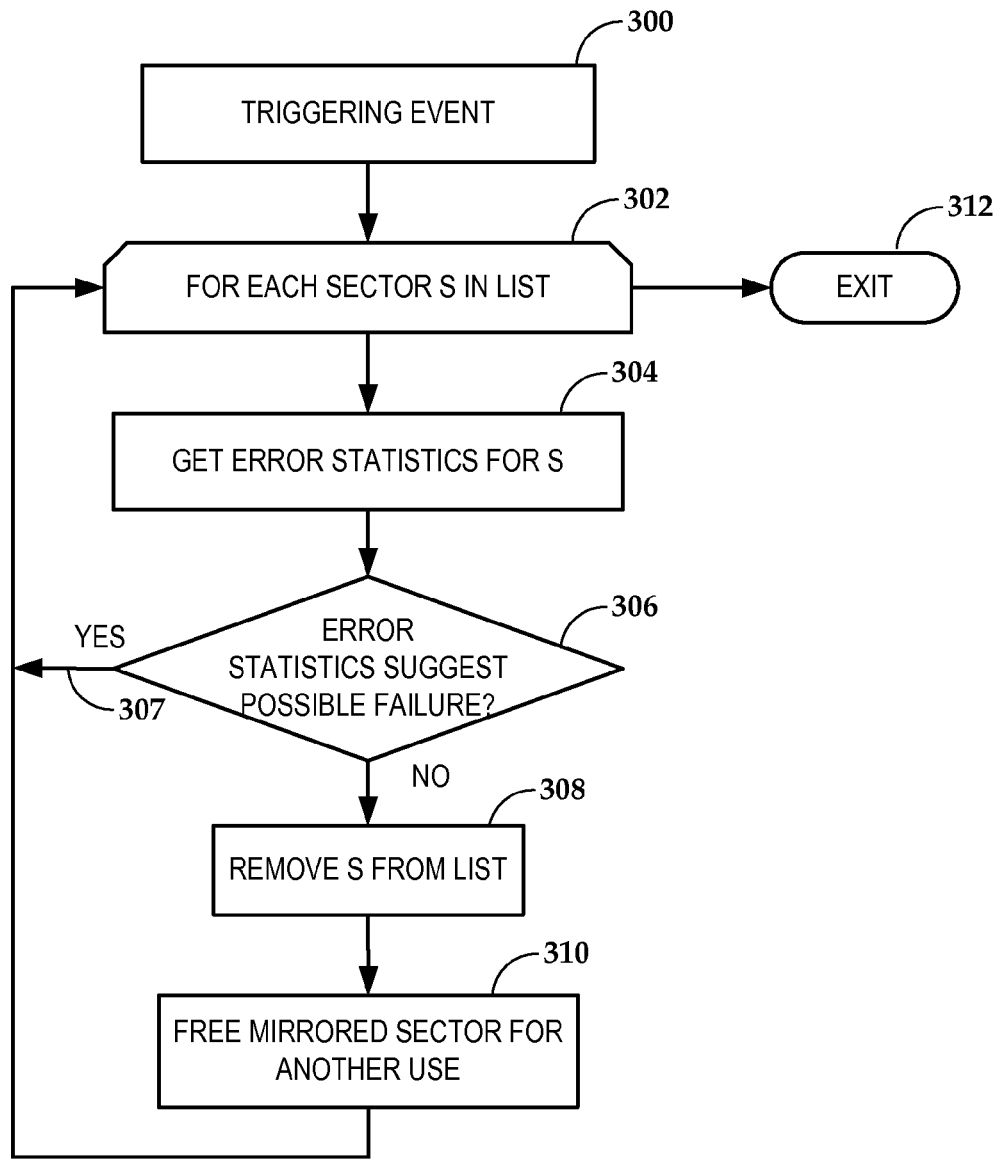
FIG. 3 is a flowchart illustrating evaluation of a list of identified sectors according to example embodiments.

An example of a procedure for 'clean-up' of a list of identified sectors according to an example embodiment is shown in a flowchart of FIG. 3. The procedure may be invoked in response to a triggering event 300, such as elapsed time, idle time, initialization, system boot/shutdown, etc. In response to the event 300, a loop 302 iterates through each member of a collection (here described as a list) that describes mirrored sectors. For each sector, error statistics are retrieved 304. These statistics may be stored with the list, or may be obtained from elsewhere, e.g., looked up in a local database using the sector address as an index. The statistics may include error history, elapsed time since last error, device age, and any other data indicative as to whether a sector may fail soon.

An evaluation 306 of the statistics determines whether any further processing is needed on the list. This evaluation may involve, for example, comparing one or more statistics with respective thresholds. If the evaluation 306 suggests failure of the sector meets some level of probability, no further processing is done on the selected sector, as represented by path 307. However, if the statistics suggest that imminent failure is unlikely (e.g., no recurrence of error after a particular elapsed time) then the data related to the sector may be removed 308 from the list. In addition, the mirrored sector may be freed 310 for other uses. This freeing 310 of the sector may be satisfied by the previous removal step 308, and/or may involve other operations. Once all of the members of the list have been iterated through 302, then the procedure exits 312.

When compared to a system where a sector is immediately reallocated, this solution described herein may reduce performance penalties to the host. For example, only writes are subsequently impacted by the mirroring operation. Reads will proceed to use the original sectors as long as the original sector can be read back without undo delay or error. During idle time, the mirrored sectors can be re-evaluated, allowing for entries to be removed from the list if no trouble is observed through extended testing. The list of mirrored sectors can be maintained in a journaled fashion, allowing for rapid appending of new entries on the fly, without risking primary copies of any user data.

Figure 4:
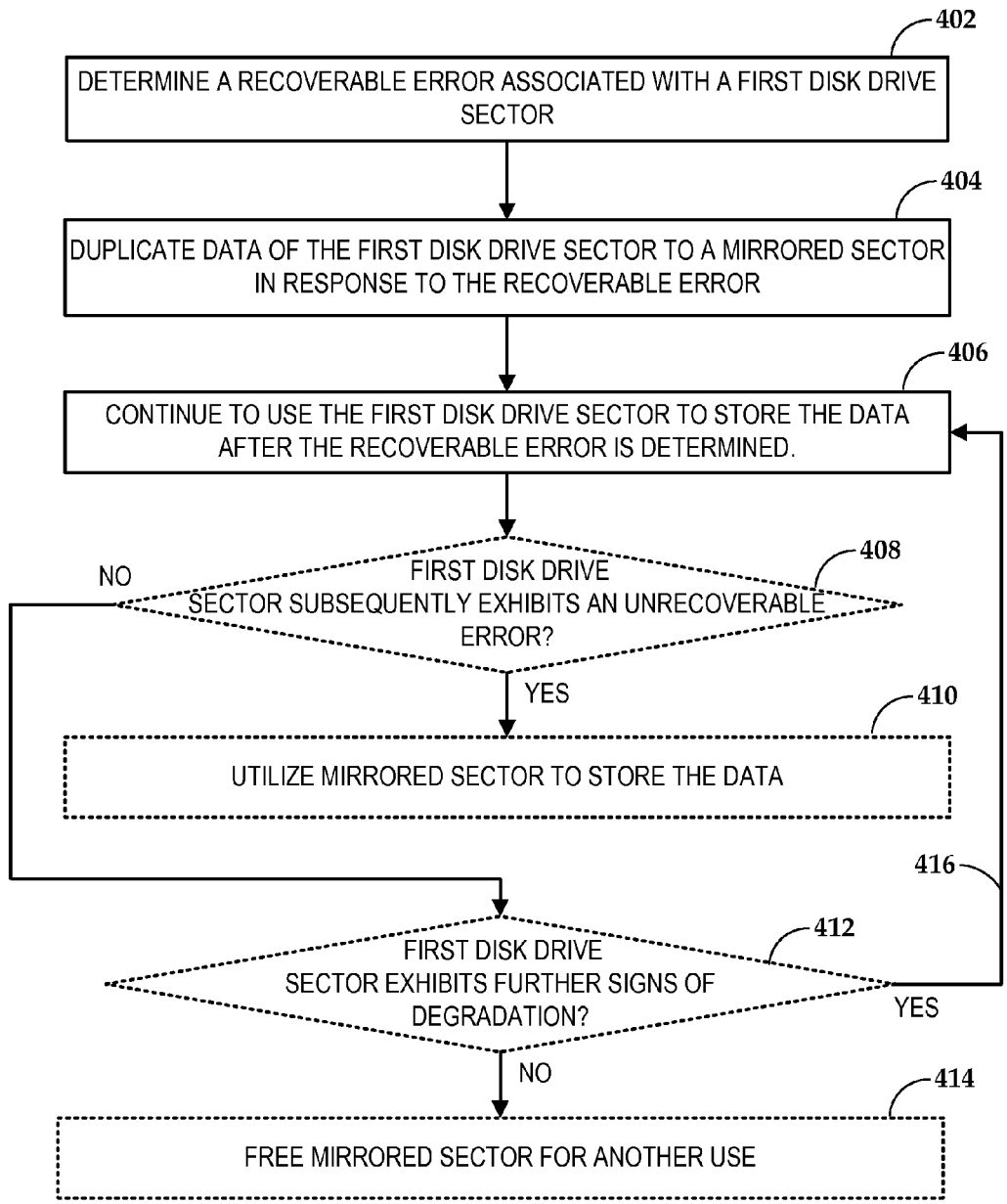
FIGS. 4 and 5 are flowcharts of procedures according to example embodiments.

In reference now to FIG. 4, a flowchart illustrates a procedure according to an example embodiment. A recoverable error associated with a first disk drive sector is determined 402. The recoverable error may include any combination of a needed number of sector clean-ups, an error rate when reading the data, and a number of write operations needed to store the data. Data of the first disk drive sector is duplicated 404 to a mirrored sector in response to the recoverable error. The first disk drive sector continues to be used 406 to store the data after the recoverable error is determined. In this context, storing the data may mean any combination of reading and writing of the sector data.

Optionally, if it is determined 408 that the first disk drive sector subsequently exhibits an unrecoverable error, the mirrored sector can be utilized 410 to store the data. This may involve (not shown) performing at least one of clearing and reallocating the first disk drive sector in response to the first disk drive sector exhibiting the unrecoverable error. Otherwise, the first disk drive sector may optionally freed 410 for another use if it is determined 412 that the first disk drive sector exhibits no further signs of degradation. Exhibiting no further signs of degradation may include exhibiting a low error rate over a predetermined period of time and/or requiring a reduced number of write operations to store new data to the first disk drive sector. For example, the recoverable error may be caused by a transient event, in which case the later determination 412 may show no further signs of degradation. Even if degradation is found, the sector can continue 406 to be used as indicated by path 416 due the sector still being recoverable, as was determined at block 408.

Figure 5:
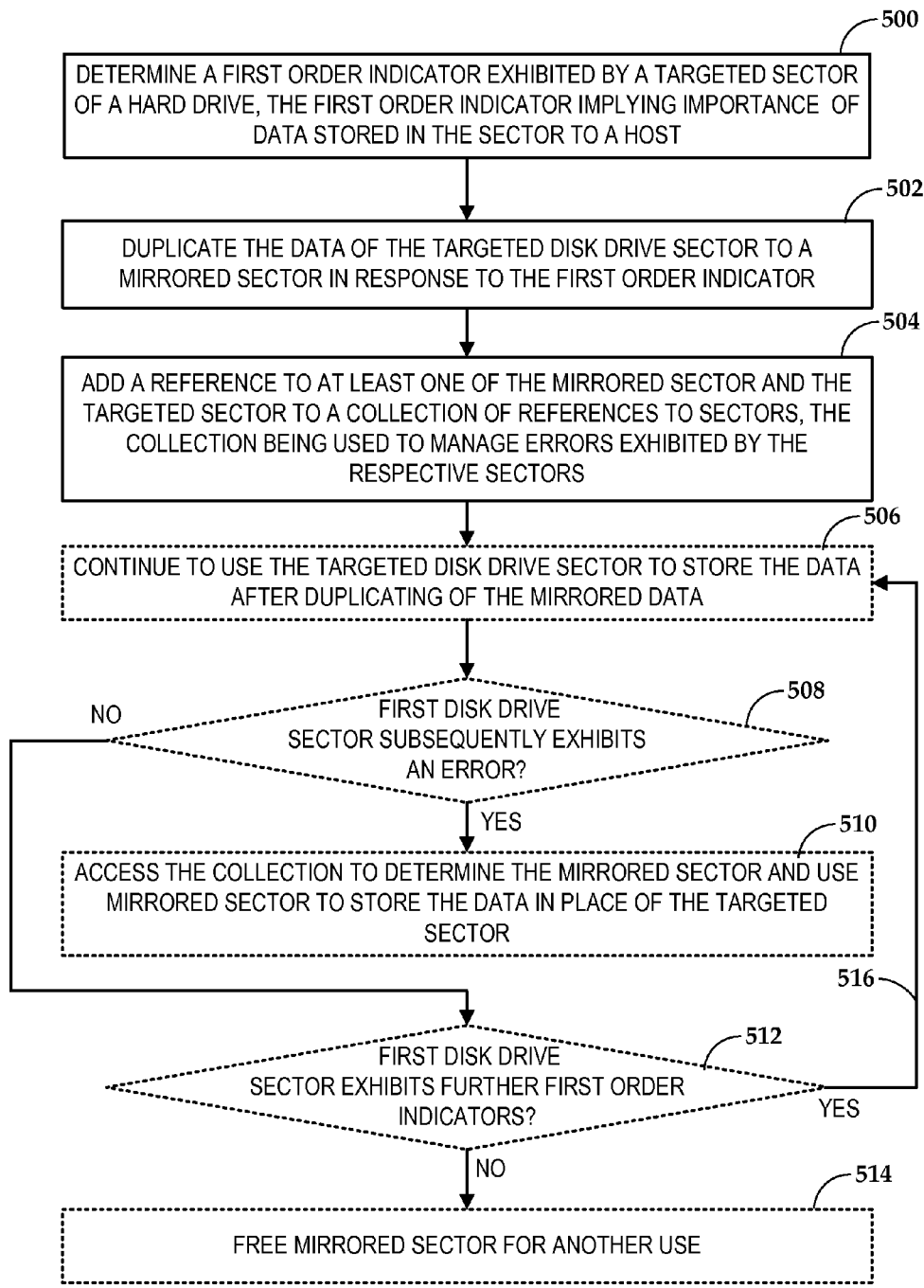

In reference now to FIG. 5, a flowchart illustrates a procedure according to an example embodiment. A first order indicator associated with a targeted disk drive sector is determined 500. The first order indicator at least implies importance of data stored in the sector to the host, e.g., based on a pattern of host access to the targeted sector. Data of the first disk drive sector is duplicated 502 to a mirrored sector in response to the recoverable error. A reference to at least one of the mirrored sector and the targeted sector is added 504 to a collection of references to sectors. The collection is used to manage errors exhibited by the respective sectors.

Optionally, the first disk drive sector continues to be used 506 to store the data after the recoverable error is determined. In this context, "storing" the data may include any combination of reading and writing of the sector data, although it will be appreciated that writing may also involve writing to the mirrored sector as well as the first disk drive sector. If it is optionally determined 508 that the targeted disk drive sector subsequently exhibits an error, the mirrored sector can be utilized 510 to store the data in place of the targeted sector. Note that the error determined at 508 need not be unrecoverable; the operation 510 may be performed in response to recoverable errors too. If no errors are determined 508, the first disk drive sector may optionally freed 514 for another use if it is determined 512 that the targeted disk drive sector exhibits no further first order indicators. Exhibiting no further first order indicators may include a change in usage patterns by the host affecting the targeted sector. If first order indicators continue to be detected 512, the sector can continue 506 to be mirrored as indicated by path 516.

It should be noted that the features of procedures in FIGS. 4 and 5 may be combined into additional embodiments. For example, first order indicators may include any combination recoverable errors and usage patterns, the latter indicative of importance of sector data to the host. Similarly, usage patterns may be additionally considered in the flowcharts of FIGS. 2 and 3. For example, in FIG. 2, incrementing 222 of error count and determination 224 of error threshold may also take into account express or implied importance of a sector to the host. Similarly, determination 306 in FIG. 3 may also take into account express or implied importance of the sector to the host.

Figure 6:
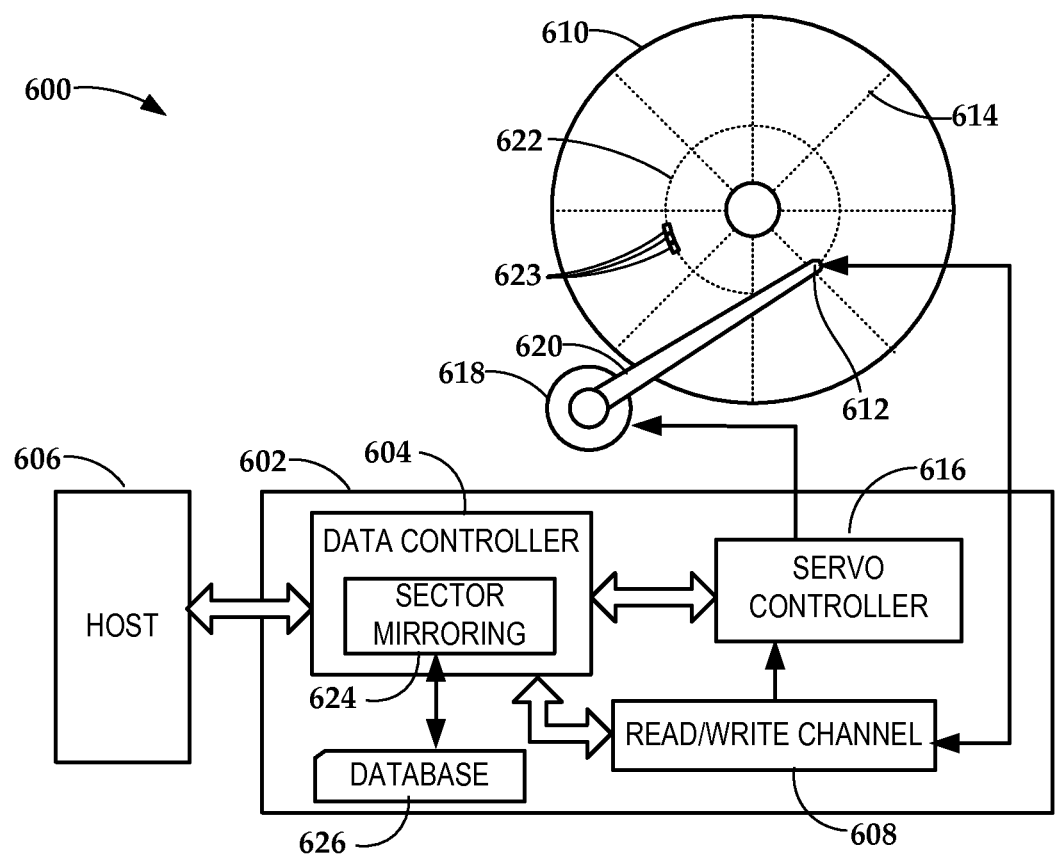
FIG. 6 is a block diagram of an apparatus according to an example embodiment.

In reference now to FIG. 6, a block diagram illustrates example HDD control circuitry 602 of an apparatus 600 according to an example embodiment. The circuitry 602 includes a data controller 604 that buffers write commands and associated data from a host device 606. The host device 606 may include any electronic device that can be communicatively coupled to store and retrieve data from an HDD, e.g., a computer. The data controller 604 carries out buffered write commands by formatting the associated data into blocks with the appropriate header information, and transfers the formatted data via a read/write channel 608 to logical block addresses (LBAs) on a data storage surface of a disk 610 identified by the associated write command. The data controller 604 provides analogous functions for read commands, e.g., determining an LBA of desired data, reading the data from the disk 610 via the read/write channel, formatting the data for the host 606, etc.

The read/write channel 608 can convert data between the digital signals processed by the data controller 604 and the analog signals conducted through read/write heads 612. The read/write channel 608 also provides servo signals read from servo marks 614 on the disk 610 to a servo controller 616. The servo controller 616 uses these signals to drive an actuator 618 (e.g., voice coil motor, or VCM) that rotates an arm 620 upon which the read/write heads 612 are mounted. Data within the servo marks 614 can be used to detect the location of a head 612 on the disk 610. The servo controller 616 can use commands from the data controller 604 and the servo data to move the head 612 to an addressed track 622 and sectors 623 on the disk 610. While data is being written to and/or read from the disk 610, the servo data is also used to maintain the head 612 aligned with the track 622.

As discussed above, the circuitry 602 may include a module 624 that assists in mirroring sectors. The module 624 may determine errors related to one or more sectors 623, e.g., as determined by controller 604 during read and write operations and/or background scans during idle time. Based on certain factors related to the errors (e.g., severity, whether error is sector-specific, recoverability), the module 624 may mirror one or more of the sectors 623 and record this event in a database 626 (e.g., list or other data structure). Alternatively, if the affected sectors 623 already have mirroring data stored in the database 626, the module 624 may update the database 626. As a result, the affected sectors 623 may continue to be used, unless the update indicates otherwise, e.g., error is unrecoverable, or the error is recoverable, but highly indicative of imminent failure.

In one arrangement, the module 624 may track patterns of usage of sectors 623 by the host 606. These patterns may imply importance of certain sectors 623 to the host, such as data that is always accessed by the host after the apparatus 600 has been first powered on. These usage patterns may cause data of targeted sectors 623 to be mirrored independently of errors currently exhibited by the sectors 623, or lack thereof. The apparatus 600 may also have ways of receiving express indications of importance of data from the host 606, in which case the module 624 may also mirror sectors 623 associated with those indications in a similar way.

The module 624 may also provide other, ongoing functions unrelated to errors. For example, the module 624 may be involved in write operations. In such a case, if a write targets a sector 623 referenced in the database, the module 624 may ensure that the mirrored sector is also written with the same data. The module 624 may also maintain other data (e.g., flag, counter, etc.) that tracks versions between the targeted/affected and mirrored sectors, to ensure that data in the sectors is the same. This may be needed, for example, if the affected sector is written, but something interrupts the drive 600 before the same data can be written to the mirrored sector.

The module 624 may also maintain entries in the database 626. As described above, under certain conditions it may be decided that mirroring of a sector 623 is no longer needed, in which case the database entry related to the sector 623 can be removed. Data in the database 626 may also be removed under other conditions, such as permanent failure of the affected sector, reformatting and/or repartitioning of the drive, usage patterns indicating the sector no longer of high importance to the host, etc.

In some embodiment, the database 626 may include a collection, such as a list that stores both references to the affected sectors 623 and mirrored sectors. Data in the database 626 may be distributed, either in whole or in part, within the media 610. For example, some or all of the data of the database 626 may be stored in the affected sectors 623 themselves. A combination of these two example arrangements may also be used. For example, the database 626 may include a collection enumerating the affected sectors 623, but references to the mirrored sectors may be stored within the sectors 623 themselves, e.g., in sector metadata.

The various embodiments described above may be implemented using circuitry and/or software modules that interact to provide particular results. One of skill in the computing arts can readily implement such described functionality, either at a modular level or as a whole, using knowledge generally known in the art. The structures and procedures shown above are only a representative example of embodiments that can be used in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
  a controller configured to cause the apparatus to:
    determine a first order indicator exhibited by a targeted sector of a hard drive, wherein the first order indicator implies importance of data stored in the targeted sector to a host based on a pattern of host access to the targeted sector;
    duplicate the data of the targeted sector to a mirrored sector of the hard drive in response to the first order indicator, the first order indicator causing the duplication to occur independently of error exhibited by the targeted sector; and
    add a reference to at least one of the mirrored sector and the targeted sector in a collection of references to sectors, wherein the collection is used to manage unrecoverable errors exhibited by the respective sectors.

2. The apparatus of claim 1, wherein the controller is further configured to cause the apparatus to:
   detect an error of the targeted sector;
   access the collection to determined the mirrored sector; and
   use the mirrored sector in place of the targeted sector in response to the error.

3. The apparatus of claim 1, wherein the first order indicator further indicates a recoverable error associated with the targeted sector, and wherein the controller is further configured to cause the apparatus to utilize the targeted sector to access the data after duplicating the data of the targeted sector to the mirrored sector.

4. The apparatus of claim 1, wherein the controller is further configured to repeatedly update the collection to remove references to sectors that no longer exhibit first order indicators.

5. The apparatus of claim 1, wherein the pattern of the host access to the targeted sector comprises a usage pattern upon boot of the host.

6. A method comprising:
   determining a usage pattern exhibited by a first disk drive sector that implies importance to a host of data of the first disk drive sector;
   duplicating the data of the first disk drive sector to a mirrored disk drive sector in response to the usage pattern, the usage pattern causing the duplication to occur independently of errors exhibited by the first disk drive sector; and
   continuing to use the first disk drive sector to store the data after duplicating the data of the first disk drive sector to the mirrored disk drive sector.

7. A method comprising:
   determining a first order indicator exhibited by a targeted sector of a hard drive, wherein the first order indicator implies importance of data stored in the targeted sector to a host based on a pattern of host access to the targeted sector;
   duplicating the data of the targeted sector to a mirrored sector of the hard drive in response to the first order indicator, the first order indicator causing the duplication to occur independently of error exhibited by the targeted sector; and
   adding a reference to at least one of the mirrored sector and the targeted sector in a collection of references to sectors, wherein the collection is used to manage unrecoverable errors exhibited by respective sectors.

8. The method of claim 7, further comprising:
   detecting an error of the targeted sector;
   accessing the collection to determine the mirrored sector; and
   using the mirrored sector in place of the targeted sector in response to the error.

9. The method of claim 7, wherein the first order indicator further indicates a recoverable error associated with the targeted sector, the method further comprising utilizing the targeted sector to access the data after duplicating the data of the targeted sector to the mirrored sector.

10. The method of claim 7, further comprising updating repeatedly the collection to remove references to sectors that no longer exhibit first order indicators.

11. The method of claim 7, wherein the pattern of the host access to the targeted sector comprises a usage pattern upon boot of the host.

* * * * *

UNITED STATES PATENT AND TRADEMARK OFFICE
CERTIFICATE OF CORRECTION

PATENT NO. : 8,954,791 B2
APPLICATION NO. : 13/352477
DATED : February 10, 2015
INVENTOR(S) : Abhay Tejmal Kataria and Christopher Ryan Fulkerson It is certified that error appears in the above-identified patent and that said Letters Patent is hereby corrected as shown below:

In the Claims

Column 8, line 64, Claim 1: "independently of error exhibited by the targeted sector" should read --independently of errors exhibited by the targeted sector--.

Column 9, line 6, Claim 2: "access the collection to determined the mirrored sector" should read --access the collection to determine the mirrored sector--.

Column 10, line 9, Claim 7: "independently of error exhibited by the targeted sector" should read --independently of errors exhibited by the targeted sector--.

Signed and Sealed this
Twenty-sixth Day of May, 2015

Michelle K. Lee
*Director of the United States Patent and Trademark Office*